US012159482B2

(12) United States Patent
Tanjim et al.

(10) Patent No.: US 12,159,482 B2
(45) Date of Patent: Dec. 3, 2024

(54) SYSTEM AND METHODS FOR DIVERSITY AUDITING

(71) Applicant: ADOBE INC., San Jose, CA (US)

(72) Inventors: Md Mehrab Tanjim, San Diego, CA (US); Ritwik Sinha, Cupertino, CA (US); Moumita Sinha, Cupertino, CA (US); David Thomas Arbour, San Jose, CA (US); Sridhar Mahadevan, Morgan Hill, CA (US)

(73) Assignee: ADOBE INC., San Jose, CA (US)

( * ) Notice: Subject to any disclaimer, the term of this patent is extended or adjusted under 35 U.S.C. 154(b) by 377 days.

(21) Appl. No.: 17/652,026

(22) Filed: Feb. 22, 2022

(65) Prior Publication Data

US 2023/0267764 A1 Aug. 24, 2023

(51) Int. Cl.
*G06V 40/16* (2022.01)

(52) U.S. Cl.
CPC .................. *G06V 40/172* (2022.01)

(58) Field of Classification Search
CPC .................................................. G06V 40/172
See application file for complete search history.

(56) References Cited

U.S. PATENT DOCUMENTS

2019/0012581 A1* 1/2019 Honkala ............... G06V 10/758

OTHER PUBLICATIONS

Logg, "Using Algorithms to Understand the Biases in Your Organization", Harvard Business Review Website, 2019, Available at https://hbr.org/2019/08/using-algorithms-to-understand-the-biases-in-your-organization, 8 pages.
Miller, et al., "How Targeted Ads and Dynamic Pricing Can Perpetuate Bias", Harvard Business Review Website, 2019, Available at https://hbr.org/2019/11/how-targeted-ads-and-dynamic-pricing-can-perpetuate-bias, 5 pages.
Condliffe, "The Week in Tech: Algorithmic Bias Is Bad. Uncovering It Is Good.", The New York Times, 2019, Available at https://www.nytimes.com/2019/11/15/technology/algorithmic-ai-bias.html, 2 pages.
Kay, et al., "Unequal Representation and Gender Stereotypes in Image Search Results for Occupations", Proceedings of the 33rd Annual ACM Conference on Human Factors in Computing Systems, 2015, Available at https://www.csee.umbc.edu/~cmat/Pubs/KayMatuszekMunsonCHI2015GenderImageSearch.pdf, 10 pages.
Celis, et al., "Implicit Diversity in Image Summarization", arXiv preprint arXiv:1901.10265v3 [cs.LG] Aug. 14, 2020, 54 pages.

(Continued)

*Primary Examiner* — Diane D Mizrahi
(74) *Attorney, Agent, or Firm* — CHAU & ASSOCIATES, LLC

(57) ABSTRACT

Systems and methods for diversity auditing are described. The systems and methods include identifying a plurality of images; detecting a face in each of the plurality of images using a face detection network; classifying the face in each of the plurality of images based on a sensitive attribute using an image classification network; generating a distribution of (Continued)

the sensitive attribute in the plurality of images based on the classification; and computing a diversity score for the plurality of images based on the distribution.

20 Claims, 9 Drawing Sheets

(56) References Cited

OTHER PUBLICATIONS

Bolukbasi, et al., "Man is to Computer Programmer as Woman is to Homemaker? Debiasing Word Embeddings", arXiv preprint arXiv:1607.06520v1 [cs.CL] Jul. 21, 2016, 25 pages.

Zhao, et al., "Men Also Like Shopping: Reducing Gender Bias Amplification using Corpus-level Constraints", arXiv preprint arXiv:1707.09457v1 [cs.AI] Jul. 29, 2017, 11 pages.

Sims, "Social media called out these fashion brands. What's next?", Vogue Business Website, 2020, Available at https://www.voguebusiness.com/companies/social-media-called-out-these-fashion-brands-whats-next, 6 pages.

Batra, et al., "Adding Diversity to Images with Open Images Extended", Google AI Blog, 2018, Available at https://ai.googleblog.com/2018/12/adding-diversity-to-images-with-open.html, 2 pages.

Deloitte, "Internal Audit's Role in Driving Diversity, Inclusion", The Wall Street Journal Risk and Compliance Journal, 2020, Available at https://deloitte.wsj.com/riskandcompliance/2020/08/03/internal-audits-role-in-driving-diversity-inclusion, 6 pages.

Jensen, "Diversity Auditing 101: How to Evaluate Your Collection", School Library Journal, 2018, Available at https://www.slj.com/?detailStory=diversity-auditing-101-how-to-evaluate-collection, 7 pages.

Kärkkäinen, et al., "FairFace: Face Attribute Dataset for Balanced Race, Gender, and Age", arXiv preprint arXiv:1908.04913v1 [cs.CV] Aug. 14, 2019, 11 pages.

Agustsson, et al., "Apparent and real age estimation in still images with deep residual regressors on APPA-REAL database", FG 2017—12th IEEE International Conference on Automatic Face and Gesture Recognition, p. 1-12, 2017, Available at https://hal.inria.fr/hal-01677892/document, 13 pages.

Zhang, et al., "Age Progression/Regression by Conditional Adversarial Autoencoder", arXiv preprint arXiv:1702.08423v2 [cs.CV] Mar. 28, 2017, 9 pages.

He, et al., "Deep Residual Learning for Image Recognition", arXiv preprint arXiv:1512.03385v1 [cs.CV] Dec. 10, 2015, 12 pages.

Agresti, 2002, "Categorical Data Analysis", 2nd Edition, John Wiley & Sons, Inc., E-Book available at https://www.wiley.com/en-us/Categorical+Data+Analysis%2C+2nd+Edition-p-9780471458760.

Mehrabi, et al., "A Survey on Bias and Fairness in Machine Learning", arXiv preprint arXiv:1908.09635v2 [cs.LG] Sep. 17, 2019, 31 pages.

\* cited by examiner

SYSTEM AND METHODS FOR DIVERSITY AUDITING

BACKGROUND

The following relates generally to data auditing, and more specifically to diversity auditing.

Data auditing refers to various processes for assessing whether a given set of data is fit for a given purpose. Diversity auditing is a subset of data auditing that refers to various processes for assessing whether a given set of data includes a diverse set of characteristics. For example, a set of images can be audited to determine if the images depict people of diverse races, ages, and genders.

However, current diversity auditing systems rely on manual identification of image attributes, and this manual approach does not scale to large image sets.

SUMMARY

A method for diversity auditing is described. One or more aspects of the method include identifying a plurality of images; detecting a face in each of the plurality of images using a face detection network; classifying the face in each of the plurality of images based on a sensitive attribute using an image classification network; generating a distribution of the sensitive attribute in the plurality of images based on the classification; and computing a diversity score for the plurality of images based on the distribution.

A method for diversity auditing is described. One or more aspects of the method include identifying a training set including a plurality of training images and label data identifying a ground truth sensitive attribute of a face in each of the plurality of training images; classifying the face in each of the plurality of images using an image classification network to obtain a predicted sensitive attribute; updating parameters of the image classification network by comparing the predicted sensitive attribute to the ground truth sensitive attribute; applying the image classification network to a plurality of images to obtain a distribution of the sensitive attribute in the plurality of images; and computing a diversity score for the plurality of images based on the distribution.

An apparatus for diversity auditing is described. One or more aspects of the apparatus include a face detection network configured to detect a face in each of a plurality of images; an image classification network configured to classify the face in each of the plurality of images based on a sensitive attribute; a distribution component configured to generate a distribution of the sensitive attribute in the plurality of images based on the classification; and a scoring component configured to compute a diversity score for the plurality of images based on the distribution.

DETAILED DESCRIPTION

Figure 1:
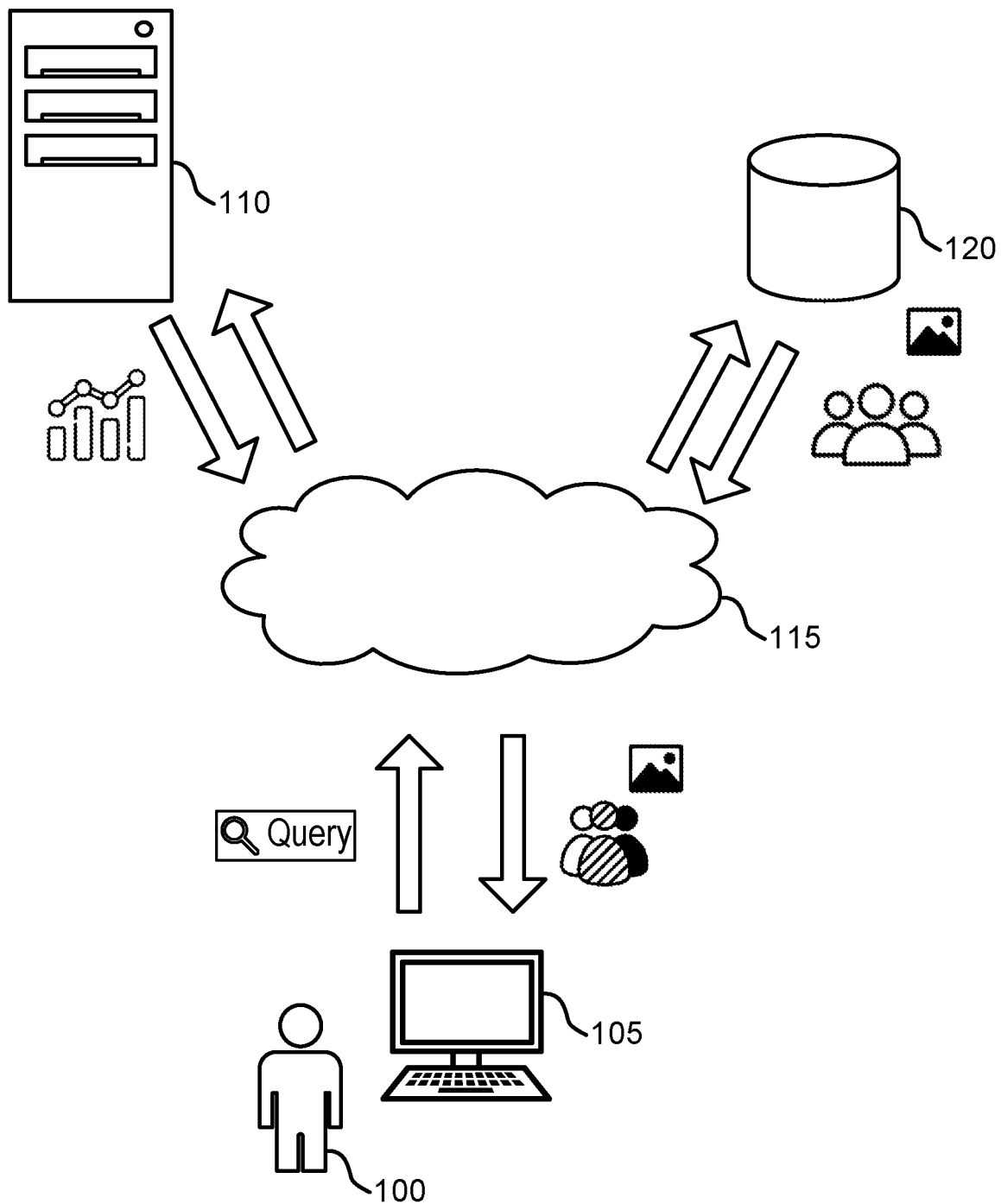
FIG. 1 shows an example of a data auditing system according to aspects of the present disclosure.

The present disclosure describes systems and methods for diversity auditing that can automatically audit a diversity of a set of images by computing a diversity score for the set of images.

Data auditing refers to various processes for assessing whether a given set of data is fit for a given purpose. Diversity auditing is a subset of data auditing that refers to various processes for assessing whether a given set of data includes a diverse set of characteristics. For example, a set of images can be audited to determine if the images depict people of diverse races, ages, and genders.

However, current diversity auditing systems rely on manual identification of image attributes, and this manual approach does not scale well to large image sets.

Accordingly, at least one embodiment of the present disclosure includes a machine learning model that identifies a plurality of images, detects a face in each of the plurality of images, classifies the face in each of the plurality of images based on a sensitive attribute, generates a distribution of the sensitive attribute in the plurality of images based on the classification, and computes a diversity score for the plurality of images based on the distribution.

By using machine learning to compute a diversity score based on a distribution of a sensitive attribute (such as race, age, or gender) in a set of images, where the distribution is based on the automatic classification of faces in the images based on the sensitive attribute, at least one embodiment of the present disclosure can automatically audit a set of images for a predetermined level of diversity of the sensitive attribute, thereby allowing a user to avoid manually identifying and tagging information related to the sensitive attribute in each image in the image set, and without requiring manual curation of a control set and labeling the images in the image set for calculating a diversity metric.

At least one embodiment of the present disclosure may be used in a diversity auditing context. For example, a user wants to audit a set of images displayed on a website or stored in a database to determine if they depict people that are representative of a certain level of diversity in one or more sensitive attributes, such as race, gender, and age. At least one embodiment of the present disclosure includes receiving a query from the user, identifying a set of images in response to the query, and computing a diversity score for the set of images based on a distribution of the sensitive attribute in the set of images. At least one embodiment further includes providing the user with one or more metrics, including the diversity score, the distribution, and the set of images. At least one embodiment further includes identifying additional images based on the diversity score, combining the additional images with the plurality of images to create a representative set of images, and providing the representative set of images to the user.

The term "sensitive attributes" refers to characteristics that can describe a person's appearance, or related to protected classes of individuals. Examples of sensitive attributes include race, gender identity, and age.

The terms "classifying" and "classification" refer to recognizing the presence of characteristics (for example, sensitive attributes such as race, gender, and age) in an image and creating data that includes a sorted listing or ordering of a description of the characteristic that is depicted in each image of a set of images.

The term "distribution" refers to a probability distribution of the presence of a given characteristic (such as a sensitive attribute) in a population or a set of images, as indicated by the classification. A distribution over a population can be determined using tools like census data and polling.

Figure 2:
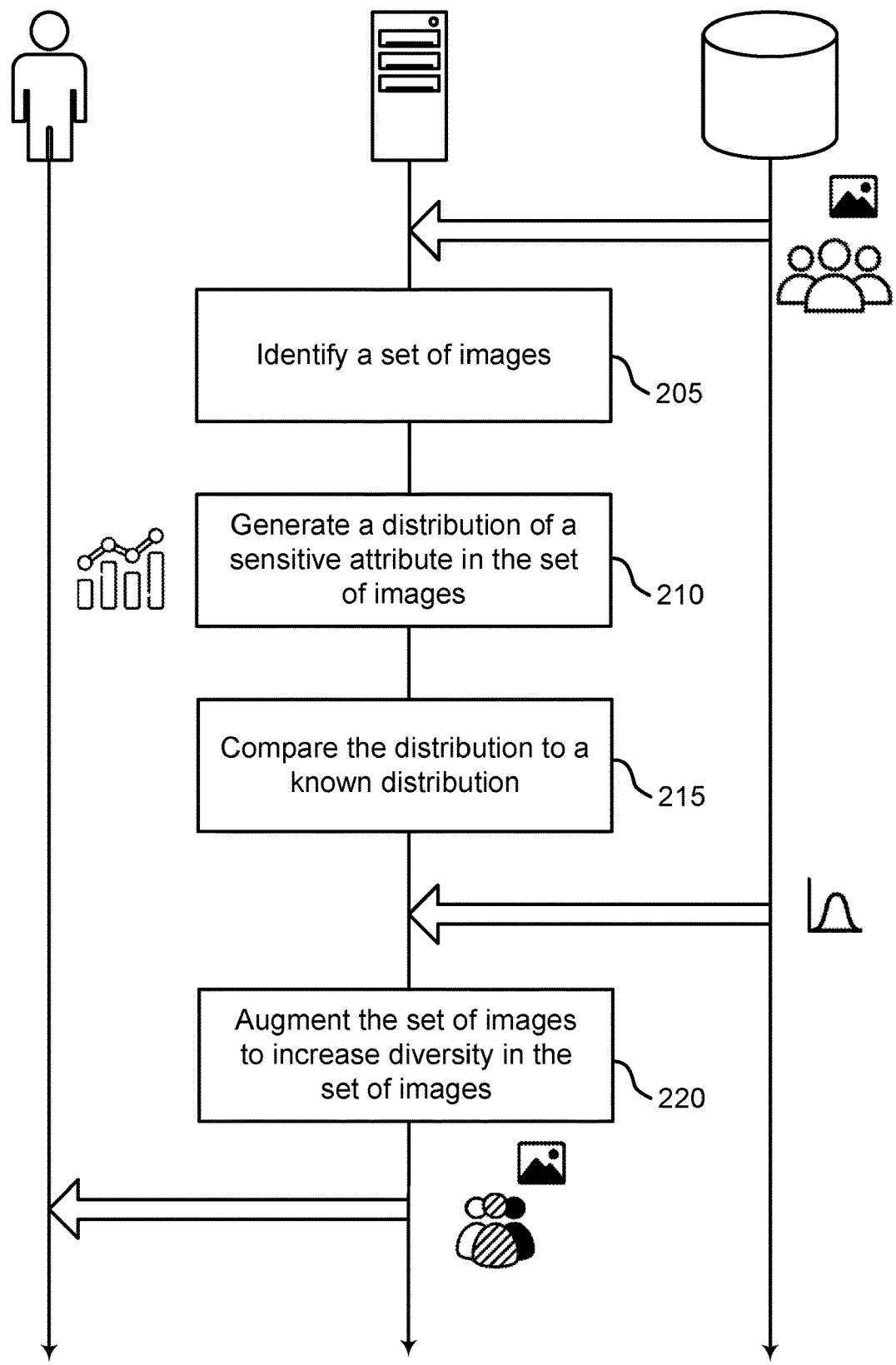
FIG. 2 shows an example of data auditing according to aspects of the present disclosure.

An example application of the inventive concept in the diversity auditing context is provided with reference to FIGS. 1-2. Details regarding the architecture of an example machine learning apparatus are provided with reference to FIGS. 3-4. Examples of a process for data auditing are provided with reference to FIGS. 5-7. Examples of a process for updating a machine learning model are provided with reference to FIGS. 8-9.

Diversity Auditing System

FIG. 1 shows an example of a diversity auditing system according to aspects of the present disclosure. The example shown includes user 100, user device 105, machine learning apparatus 110, cloud 115, and database 120.

Referring to FIG. 1, machine learning apparatus 110 may receive an image search query from user 100 via user device 105 and cloud 115. For example, the image search query may include a keyword such as "plumber", or an instruction to retrieve images from one or more websites. User 100 may desire a set of images that reflect a predetermined level of diversity in a sensitive attribute. Responsive to the query, machine learning apparatus 110 may retrieve a plurality of images corresponding to the image search query from database 120 via cloud 115, generate a distribution of a sensitive attribute in the plurality of images, and compute a diversity score based on the distribution. In some cases, the plurality of images is retrieved from a website rather than database 120. If the diversity score is beneath a predetermined threshold, machine learning apparatus 110 may retrieve additional images from database 120 to add to the plurality of images to create an augmented plurality of images (e.g., representative images). Machine learning apparatus 110 may then generate a distribution of a sensitive attribute in the augmented plurality of images and compute a diversity score based on the distribution. Machine learning apparatus 110 may repeat this process until the diversity score meets or exceeds the predetermined threshold. Machine learning apparatus 110 may then provide the plurality of images, the augmented plurality of images, and metrics including the diversity score, the distribution of the plurality of images, and the distribution of the augmented plurality of images to user 100 via cloud 115 and user device 105.

User device 105 may be a personal computer, laptop computer, mainframe computer, palmtop computer, personal assistant, mobile device, or any other suitable processing apparatus. In some examples, user device 105 includes software that communicates with machine learning apparatus 110, cloud 115, and database 120 to provide the image search query, receive and display images, and receive and display metrics. A user interface may enable user 100 to interact with user device 105. In some embodiments, the user interface may include an audio device, such as an external speaker system, an external display device such as a display screen, or an input device (e.g., a remote control device interfaced with the user interface directly or through an IO controller module). In some cases, a user interface may be a graphical user interface (GUI).

Machine learning apparatus 110 may include a computer implemented network that includes a machine learning model including one or more neural networks. Machine learning apparatus 110 may also include one or more processors, a memory subsystem, a communication interface, an I/O interface, one or more user interface components, and a bus. Additionally, machine learning apparatus 110 may communicate with user device 105 and database 120 via cloud 115.

In some cases, machine learning apparatus 110 is implemented on a server. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Figure 3:
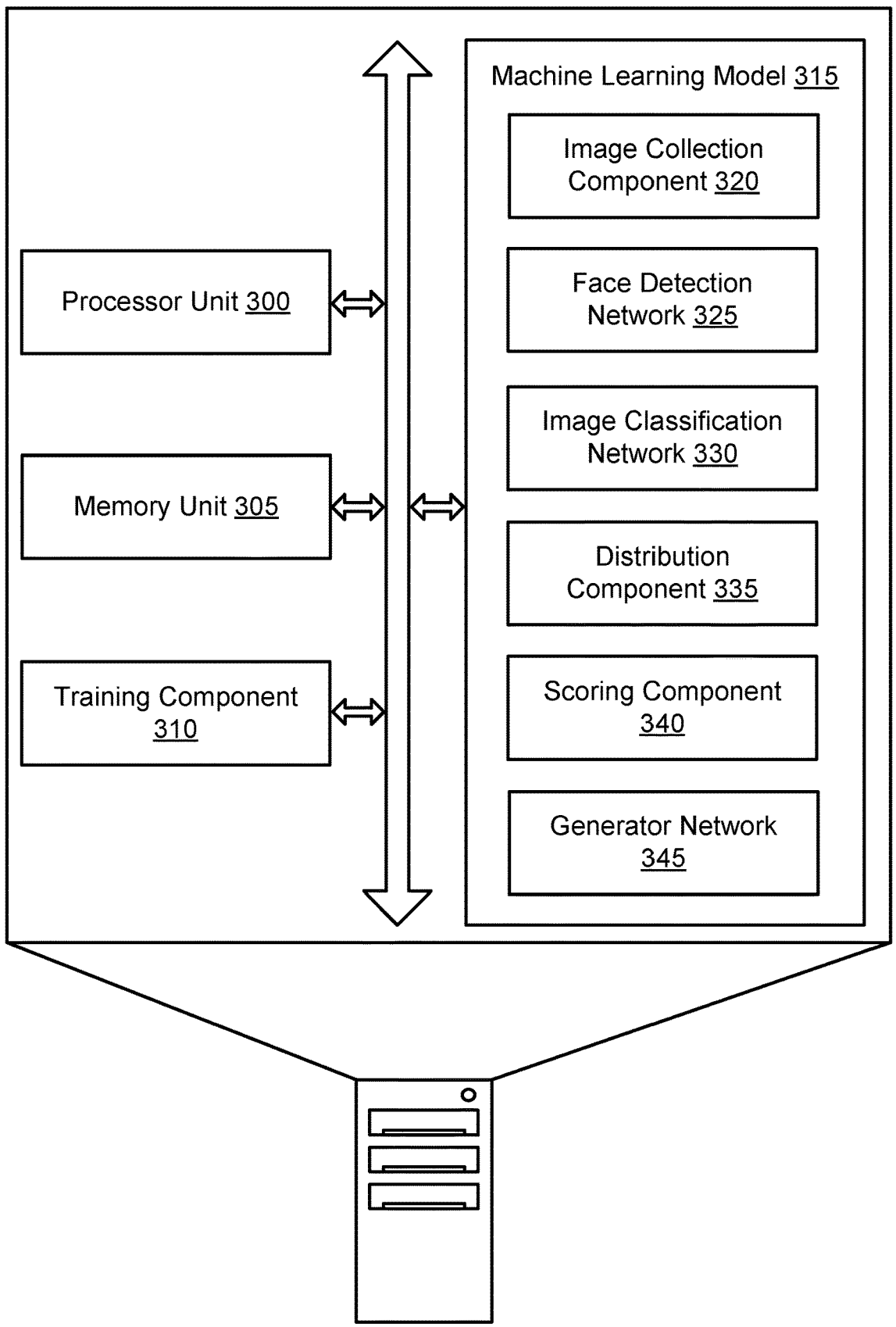
FIG. 3 shows an example of a machine learning apparatus according to aspects of the present disclosure.
Figure 4:
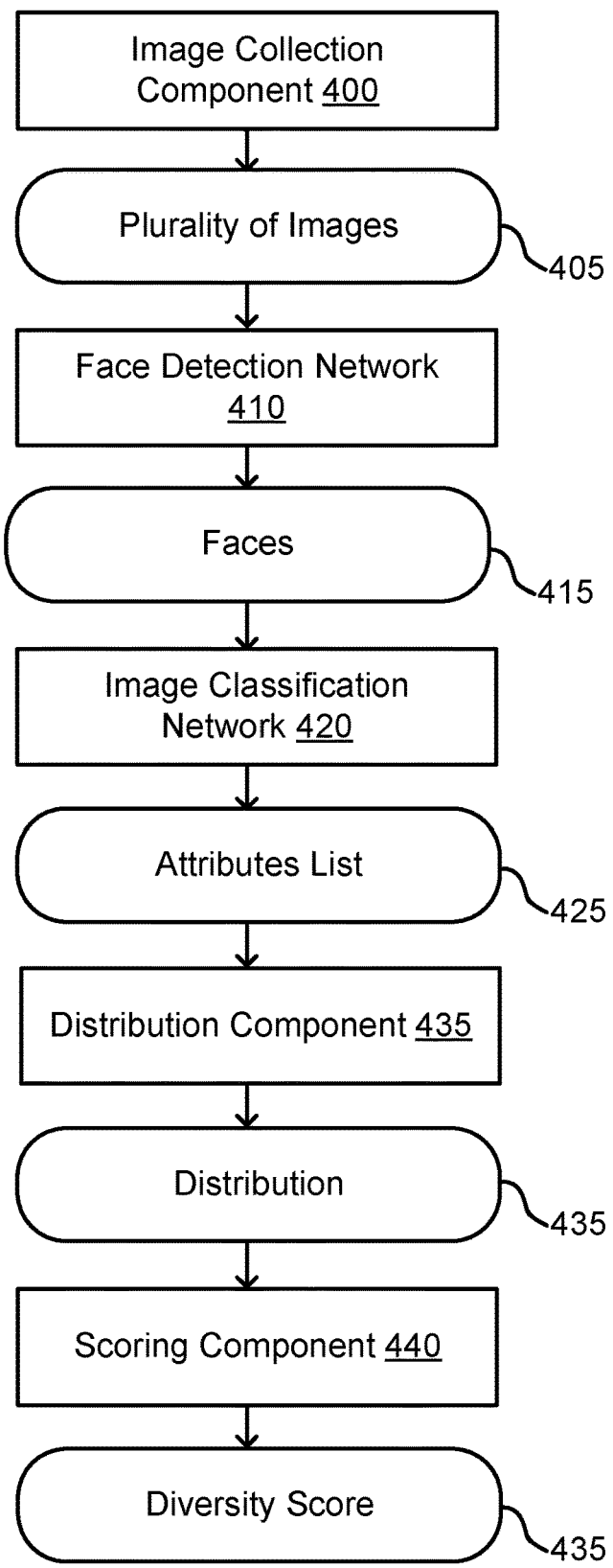
FIG. 4 shows an example of computing a diversity score according to aspects of the present disclosure.

Further detail regarding the architecture of machine learning apparatus 110 is provided with reference to FIGS. 3-4. Further detail regarding a diversity process is provided with reference to FIGS. 5-7. Further detail regarding a process for updating the machine learning model is provided with reference to FIGS. 8-9.

A cloud such as cloud 115 is a computer network configured to provide on-demand availability of computer system resources, such as data storage and computing power. In some examples, cloud 115 provides resources without active management by user 100. For example, the computing resources may be included in cloud 115. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

A database such as database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, user 100 interacts with the database controller. In other cases, the database controller may operate automatically without user interaction.

User 100 is an example of, or includes aspects of, the corresponding element described with reference to FIG. 2. Machine learning apparatus 110 is an example of, or includes aspects of, the corresponding element described with reference to FIGS. 2-3. Database 120 is an example of, or includes aspects of, the corresponding element described with reference to FIG. 2.

FIG. 2 shows an example of diversity auditing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, a machine learning apparatus identifies a set of images and audits the set of images by generating a distribution of a sensitive attribute in the set of images and comparing the distribution to a known distribution. In response to the audit, the machine learning apparatus may augment the set of images to increase diversity in the set of images.

At operation 205, the system identifies a set of images. In some cases, the operations of this step refer to, or may be performed by, a machine learning apparatus as described with reference to FIGS. 1 and 3. For example, the machine learning apparatus identifies a set of images that correspond to an image search query received from a user, and automatically retrieves the images from a database described with reference to FIG. 1 or from a website. In some cases, the user may wish to be provided with a set of images depicting a diverse group of people. In other cases, the user may wish to quantify the diversity of people that are depicted in images that are present on a website.

At operation 210, the system generates a distribution of a sensitive attribute in the set of images. In some cases, the operations of this step refer to, or may be performed by, a machine learning apparatus as described with reference to FIGS. 1 and 3. The sensitive attribute may correspond to at least one of a race, gender, and age of a person depicted in an image in the set of images. The distribution of the sensitive attribute may be a probability distribution representing diversity in the sensitive attribute that is depicted in the set of images. In at least one embodiment, the machine learning apparatus generates the distribution of the sensitive attribute as described with reference to FIG. 5.

At operation 215, the system compares the distribution to a known distribution. In some cases, the operations of this step refer to, or may be performed by, a machine learning apparatus as described with reference to FIGS. 1 and 3. For example, the machine learning apparatus may retrieve a known distribution of the sensitive attribute, such as distributions provided from census data, from the database or from a website.

At operation 220, the system augments the set of images to increase diversity in the set of images. In some cases, the operations of this step refer to, or may be performed by, a machine learning apparatus as described with reference to FIGS. 1 and 3. For example, the machine learning apparatus may compute a diversity score based on comparing the distribution and the known distribution, and determine that the set of images is below a predetermined threshold of diversity in the number of different types of the sensitive attribute that are depicted by the set of images. The machine learning model may then augment the set of images with additional retrieved images until the augmented set of images (e.g., representative images) meets or exceeds the predetermined threshold of diversity. The machine learning model may then provide the set of images, the augmented set of images, and metrics including the distribution, the known distribution, and data relating to the comparison of the distribution and the known distribution to the user.

Architecture

An apparatus for diversity auditing is described. One or more aspects of the apparatus include a face detection network configured to detect a face in each of a plurality of images; an image classification network configured to classify the face in each of the plurality of images based on a sensitive attribute; a distribution component configured to generate a distribution of the sensitive attribute in the plurality of images based on the classification; and a scoring component configured to compute a diversity score for the plurality of images based on the distribution.

Some examples of the apparatus further include an image collection component configured to collect the plurality of images from a website. Some examples of the apparatus further include a generator network configured to generate additional images based on the diversity score. In some aspects, the face detection network comprises a convolutional neural network (CNN) architecture. In some aspects, the image classification network comprises a ResNet architecture.

FIG. 3 shows an example of a machine learning apparatus according to aspects of the present disclosure. The example shown includes processor unit 300, memory unit 305, training component 310, and machine learning model 315.

Processor unit 300 includes one or more processors. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 300 is configured to operate a memory array using a memory controller. In other cases, a memory controller is integrated into processor unit 300. In some cases, processor unit 300 is configured to execute computer-readable instructions stored in memory unit 305 to perform various functions. In some embodiments, processor unit 300 includes special purpose components for modem processing, baseband processing, digital signal processing, or transmission processing.

Memory unit 305 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 300 to perform various functions described herein. In some cases, memory unit 305 contains, among other things, a basic input/output system (BIOS) which controls basic hardware or software operation such as the interaction with peripheral components or devices. In some cases, memory unit 305 includes a memory controller that operates memory cells of memory unit 305. For example, the memory controller may include a row decoder, column decoder, or both. In some cases, memory cells within memory unit 305 store information in the form of a logical state.

Machine learning model 315 may include one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

In one aspect, machine learning model 315 includes image collection component 320, face detection network 325, image classification network 330, distribution component 335, scoring component 340, and generator network 345.

According to some aspects, image collection component 320 identifies a set of images (e.g., a plurality of images). In some examples, image collection component 320 identifies a website. In some examples, image collection component 320 collects the set of images from the website. In some examples, image collection component 320 performs an image search on the website. In some examples, image collection component 320 receives search results for the image search, where the set of images are collected from the search results. In some examples, image collection component 320 combines the set of images with additional images to obtain a representative set of images. Image collection component 320 is an example of, or includes aspects of, the corresponding element described with reference to FIG. 4.

According to some aspects, face detection network 325 detects a face in each of the set of images. In some aspects, the face detection network 325 includes a convolutional neural network (CNN) architecture. A CNN is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. Face detection network 325 is an example of, or includes aspects of, the corresponding element described with reference to FIGS. 4 and 7.

According to some aspects, image classification network 330 classifies the face in each of the set of images based on a sensitive attribute. In some examples, image classification network 330 generates an image feature vector for each of the set of images, where the classification is based on the image feature vector. In some examples, image classification network 330 identifies additional images having the sensitive attribute based on the diversity score. In some aspects, the sensitive attribute includes race, gender, or age.

According to some aspects, image classification network 330 classifies the face in each of the set of images using an image classification network 330 to obtain a predicted sensitive attribute. In some aspects, the image classification network 330 includes a residual neural network (ResNet) architecture. A ResNet is an ANN that mimics pyramidal neurons in a human brain by using skip connections to jump over layers of the network. These skip connections help the network by effectively reducing the number of layers present in initial training stages, thereby avoiding vanishing gradients and minimizing accuracy saturation, in which adding layers to a neural network that is already "saturated" with layers increases training error. During training, weights are adjusted to "skip" a layer and amplify a previous skipped layer. In an example scenario, weights for an adjacent layer are adjusted and weights are not applied to an upstream layer. As the ResNet layer is trained, the skipped layers are gradually restored. Image classification network 330 is an example of, or includes aspects of, the corresponding element described with reference to FIGS. 4 and 7.

According to some aspects, distribution component 335 generates a distribution of the sensitive attribute in the set of images based on the classification. In some examples, distribution component 335 identifies a comparison population for the set of images. In some examples, distribution component 335 identifies a baseline distribution of the sensitive attribute based on the comparison population, where the diversity score is computed by comparing the distribution and the baseline distribution. In some examples, distribution component 335 identifies an additional baseline distribution of the sensitive attribute, where the diversity score is computed by comparing the distribution to the baseline distribution and the additional baseline distribution. According to some aspects, distribution component 335 applies the image classification network 330 to a set of images to obtain a distribution of the sensitive attribute in the set of images.

Distribution component 335 is an example of, or includes aspects of, the corresponding element described with reference to FIGS. 4 and 7.

According to some aspects, scoring component 340 computes a diversity score for the set of images based on the distribution. In some examples, scoring component 340 orders the images based on the diversity score. In some examples, scoring component 340 computes a Hellinger distance between the distribution and the baseline distribution, where the diversity score is based on the Hellinger distance. Scoring component 340 is an example of, or includes aspects of, the corresponding element described with reference to FIGS. 4 and 7.

According to some aspects, generator network 345 is configured to generate additional images based on the diversity score. According to some aspects, generator network 345 generates the additional images using a generative adversarial network (GAN). A GAN is a category of ANN where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some examples, a GAN includes a producing network and a discriminator network. The producing network generates candidates while the discriminator network evaluates them. The producing network learns to map from a latent space to a data distribution of interest, while the discriminator network distinguishes candidates produced by the producing network from the true data distribution. The producing network's training objective is to increase the error rate of the discriminator network (i.e., to produce novel candidates that the discriminator network classifies as real).

According to some aspects, training component 310 is configured to update machine learning model 315. According to some aspects, training component 310 identifies a training set including a plurality of training images and label data identifying a ground truth sensitive attribute of a face in each of the plurality of training images. In some examples, training component 310 updates parameters of the image classification network by comparing the predicted sensitive attribute to the ground truth sensitive attribute. According to some aspects, training component 310 computes a loss function based on comparing the predicted sensitive attribute to the ground truth sensitive attribute. According to some aspects, training component 310 computes a gradient of the loss function, wherein the parameters of the image classification network are updated based on the gradient of the loss function.

FIG. 4 shows an example of computing a diversity score according to aspects of the present disclosure. The example shown includes image collection component 400, plurality of images 405, face detection network 410, faces 415, image classification network 420, attributes list 425, distribution component 430, distribution 435, scoring component 440, and diversity score 445.

Referring to FIG. 4, image collection component 400 retrieves and provides plurality of images 405. Face detection network 410 receives plurality of images 405 as input and outputs faces 415. Image classification network 420 receives faces 415 as input and outputs attributes list 425. Distribution component 430 receives attributes list 425 as input and outputs distribution 435. Scoring component 440 receives distribution 435 as input and outputs diversity score 445.

Image collection component 400 is an example of, or includes aspects of, the corresponding element described with reference to FIG. 3. Plurality of images 405 is an example of, or includes aspects of, the corresponding element described with reference to FIG. 7. Face detection network 410 is an example of, or includes aspects of, the corresponding element described with reference to FIGS. 3 and 7. Faces 415 is an example of, or includes aspects of, the corresponding element described with reference to FIG. 7. Image classification network 420 is an example of, or includes aspects of, the corresponding element described with reference to FIGS. 3 and 7. Attributes list 425 is an example of, or includes aspects of, the corresponding element described with reference to FIG. 7. Distribution component 430 is an example of, or includes aspects of, the corresponding element described with reference to FIGS. 3 and 7. Scoring component 440 is an example of, or includes aspects of, the corresponding element described with reference to FIGS. 3 and 7.

Diversity Auditing

A method for diversity auditing is described. One or more aspects of the method include identifying a plurality of images; detecting a face in each of the plurality of images using a face detection network; classifying the face in each of the plurality of images based on a sensitive attribute using an image classification network; generating a distribution of the sensitive attribute in the plurality of images based on the classification; and computing a diversity score for the plurality of images based on the distribution.

Some examples of the method further include identifying a website. Some examples further include collecting the plurality of images from the website. Some examples of the method further include performing an image search on the website. Some examples further include receiving search results for the image search, wherein the plurality of images is collected from the search results.

Some examples of the method further include ordering the plurality of images based at least in part on the diversity score. Some examples of the method further include generating an image feature vector for each of the plurality of images, wherein the classification is based on the image feature vector.

Some examples of the method further include identifying a comparison population for the plurality of images. Some examples further include identifying a baseline distribution of the sensitive attribute based on the comparison population, wherein the diversity score is computed by comparing the distribution and the baseline distribution.

Some examples of the method further include computing a Hellinger distance between the distribution and the baseline distribution, wherein the diversity score is based on the Hellinger distance. Some examples of the method further include identifying an additional baseline distribution of the sensitive attribute, wherein the diversity score is computed by comparing the distribution to the baseline distribution and the additional baseline distribution.

Some examples of the method further include identifying additional images having the sensitive attribute based on the diversity score. Some examples further include combining the plurality of images with the additional images to obtain a representative set of images. Some examples of the method further include generating the additional images using a generative adversarial network (GAN). In some aspects, the sensitive attribute comprises race, gender, or age.

Figure 5:
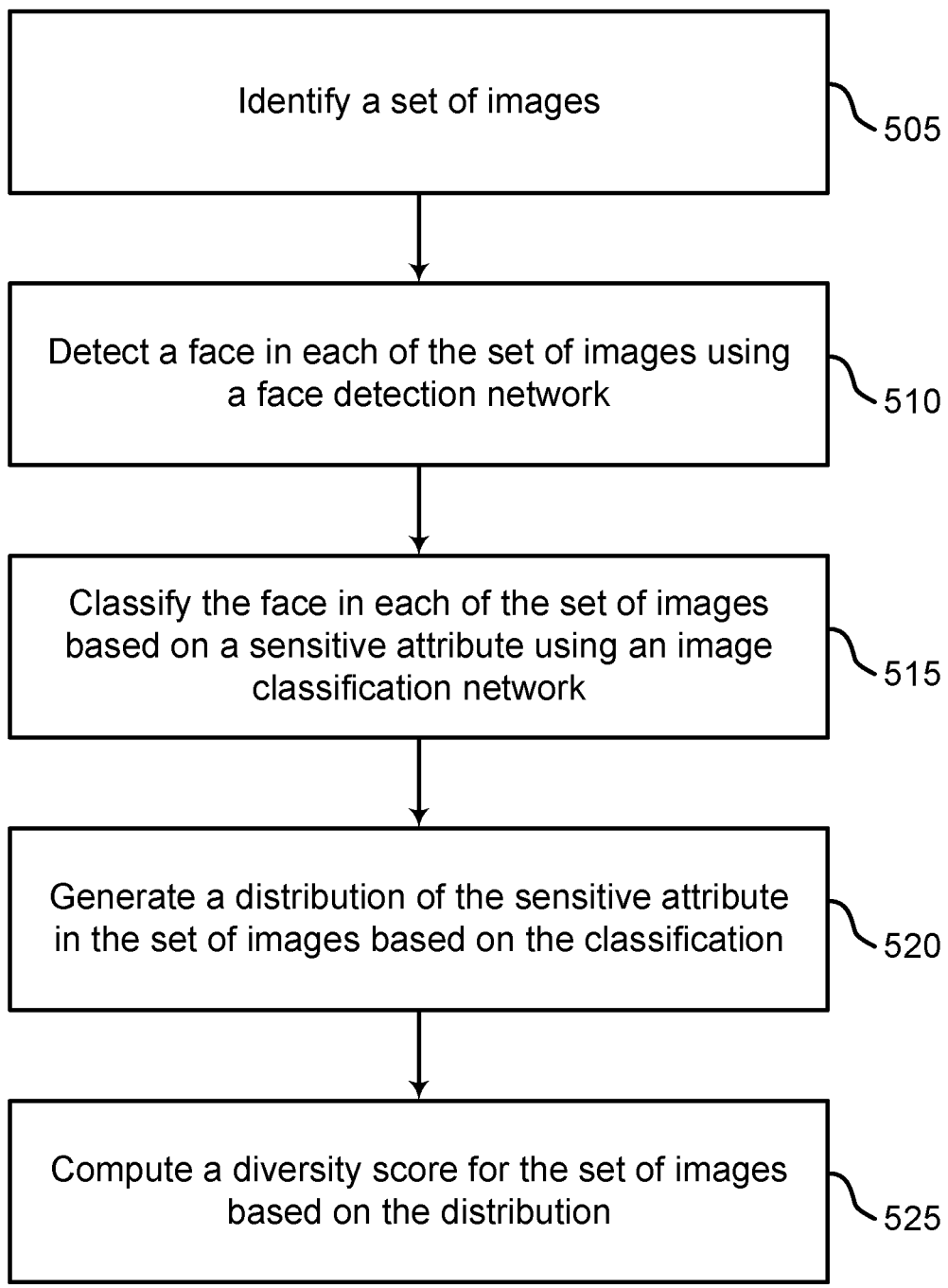
FIG. 5 shows an example of a process for diversity scoring according to aspects of the present disclosure.

FIG. 5 shows an example of diversity scoring according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, a user may want to audit a set of images displayed on a website or stored in a database to determine if they depict people that are representative of a certain level of diversity in one or more sensitive attributes, such as race, gender, and age. The system identifies a set of images, detects a face in each of the set of images, classifies the face in each of the set of images based on a sensitive attribute, generates a distribution of the sensitive attribute in the set of images based on the classification, and computes a diversity score for the set of images based on the distribution.

At operation 505, the system identifies a set of images. In some cases, the operations of this step refer to, or may be performed by, an image collection component as described with reference to FIGS. 3 and 4. In at least one embodiment, the image collection component identifies the set of images as described with reference to FIG. 7.

At operation 510, the system detects a face in each of the set of images. In some cases, the operations of this step refer to, or may be performed by, a face detection network as described with reference to FIGS. 3, 4, and 7. In at least one embodiment, the face detection network detects a face in each of the set of images as described with reference to FIG. 7.

At operation 515, the system classifies the face in each of the set of images based on a sensitive attribute. In some cases, the operations of this step refer to, or may be performed by, an image classification network as described with reference to FIGS. 3, 4, and 7. In at least one embodiment, the image classification network classifies the face in each of the set of images based on the sensitive attribute as described with reference to FIG. 7.

At operation 520, the system generates a distribution of the sensitive attribute in the set of images based on the classification. In some cases, the operations of this step refer to, or may be performed by, a distribution component as described with reference to FIGS. 3, 4, and 7. In at least one embodiment, the distribution component generates the distribution of the sensitive attribute in the set of images based on the classification as described with reference to FIG. 7.

At operation 525, the system computes a diversity score for the set of images based on the distribution. In some cases, the operations of this step refer to, or may be performed by, a scoring component as described with reference to FIGS. 3, 4, and 7. In at least one embodiment, the scoring component computes a diversity score for the set of images based on the distribution as described with reference to FIG. 7.

Figure 6:
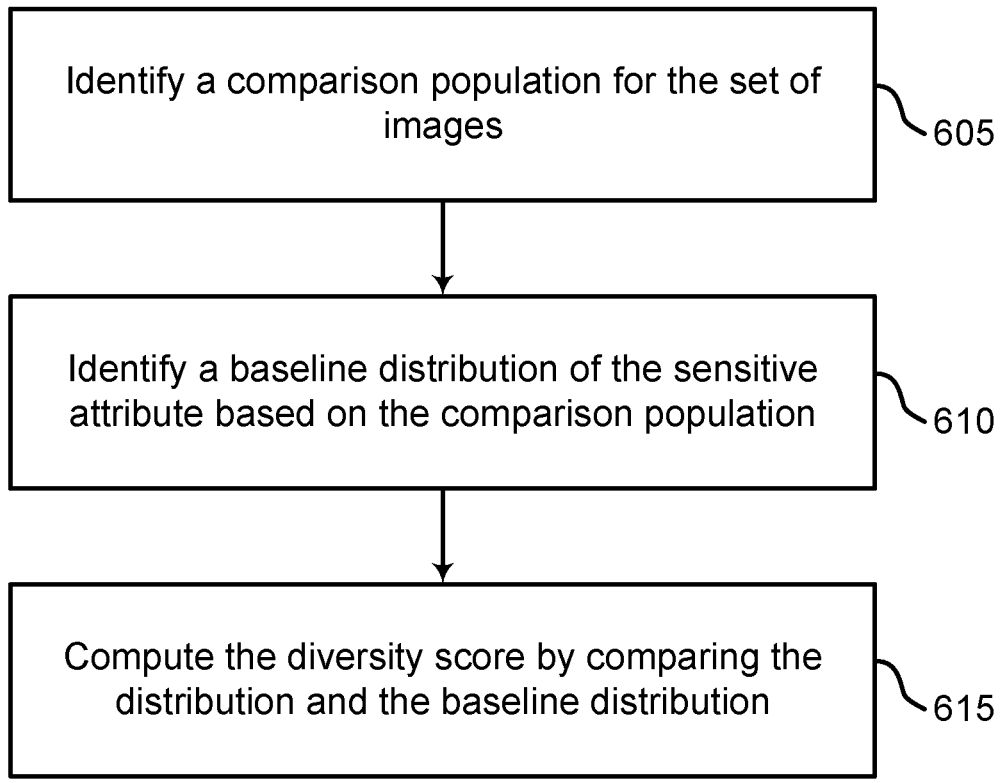
FIG. 6 shows an example of a process for comparing distributions according to aspects of the present disclosure.

FIG. 6 shows an example of comparing distributions according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system identifies a comparison population for the set of images. In some cases, the operations of this step refer to, or may be performed by, a distribution component as described with reference to FIGS. 3, 4, and 7. In at least one embodiment, the distribution component identifies a comparison population for the set of images as described with reference to FIG. 7.

At operation 610, the system identifies a baseline distribution of the sensitive attribute based on the comparison population. In some cases, the operations of this step refer to, or may be performed by, a distribution component as described with reference to FIGS. 3, 4, and 7. In at least one embodiment, the distribution component identifies a baseline distribution of the sensitive attribute as described with reference to FIG. 7.

At operation 615, the system computes the diversity score by comparing the distribution and the baseline distribution. In some cases, the operations of this step refer to, or may be performed by, a scoring component as described with reference to FIGS. 3, 4, and 7. In at least one embodiment, a scoring component computes the diversity score by comparing the distribution and the baseline distribution as described with reference to FIG. 7.

Figure 7:
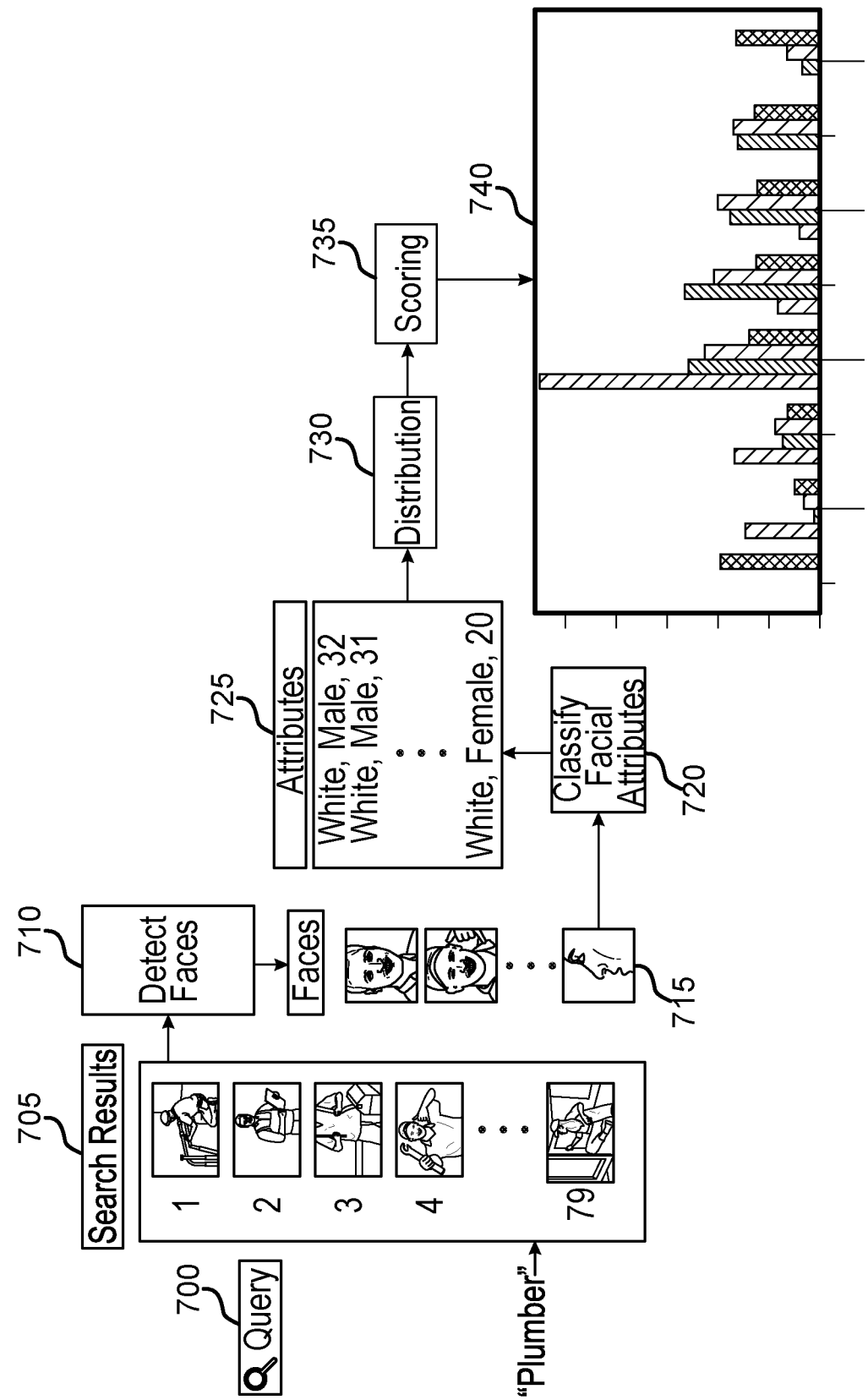
FIG. 7 shows an example of diversity auditing according to aspects of the present disclosure.

FIG. 7 shows an example of diversity auditing according to aspects of the present disclosure. The example shown includes query 700, plurality of images 705, face detection network 710, faces 715, image classification network 720, attributes list 725, distribution component 730, scoring component 735, and metrics 740.

Referring to FIG. 7, a user provides query 700 to a machine learning apparatus as described with reference to FIGS. 1-3 via a user device as described with reference to FIGS. 1-2. The machine learning apparatus includes a machine learning model as described with reference to FIGS. 3-4 that includes an image collection component, face detection network 710, image classification network 720, distribution component 730, and scoring component 735. Each of the image collection component, face detection network 710, image classification network 720, distribution component 730, and scoring component 735 include one or more neural networks that are trained through deep-learning processes to perform their respective functions.

Query 700 may instruct the machine learning apparatus to retrieve images from a database as described with reference to FIGS. 1-2 according to a keyword-based image search, or may instruct the machine learning apparatus to retrieve some or all images from one or more websites. Query 700 may include keywords that correspond to images. The user may wish to be provided with a set of images that are representative of a certain level of diversity with regards to at least one sensitive attribute, such as race, gender, and age, or the user may wish to audit the level of diversity with regards to the at least one sensitive attribute in some or all of the images that are displayed on the one or more websites.

The image collection component receives query 700 and retrieves plurality of images 705 as search results in response to query 700. In at least one embodiment, plurality of images 705 are images stored in a database or displayed on one or more websites and correspond to a keyword in query 700. In at least one embodiment, plurality of images 705 are images displayed on one or more websites and are retrieved based on an instruction in query 700 to retrieve images from the one or more websites. FIG. 7 illustrates an example in which the image collection component retrieves a plurality of images 705 that correspond to a keyword "plumber" included in query 700.

Face detection network 710 receives plurality of images 705 from the image collection component and detects faces 715 in plurality of images 705. In at least one embodiment, face detection network 710 includes a convolutional neural network (CNN) that has been trained using deep learning to detect faces in images, including faces that are depicted at different angles, poses, etc.

Image classification network 720 receives faces 715 and classifies faces 715 according to one or more sensitive attributes. "Classifying" refers to sorting objects into an ordered list such as attributes list 725 based on given criteria. For example, the given criteria are the one or more sensitive attributes. In at least one embodiment, the one or more sensitive attributes includes race, gender, or age. In at least one embodiment, image classification network 720 generates an image feature vector for each of plurality of images 705, where the classification is based on the image feature vector. In at least one embodiment, the image classification network classifies faces 715 to obtain classification using a residual neural network (ResNet) architecture. FIG. 7 illustrates an example in which attributes list 725 reflects classes of three sensitive attributes (race, gender, and age) in each face of faces 715 by image classification network 720.

Distribution component 730 generates a distribution of the one or more sensitive attributes in plurality of images 705 based on the classification. The distribution may be a probability distribution representing the probability that diversity in the one or more sensitive attribute is depicted in the set of images, as indicated by attributes list 725 produced by the classification. In some examples, distribution component 730 identifies a comparison population for the set of images. In some examples, distribution component 730 identifies a baseline distribution of the sensitive attribute based on the comparison population. For example, the baseline distribution may be population census data. In some examples, distribution component 335 identifies an additional baseline distribution of the sensitive attribute. For example, the additional baseline distribution may be data other than population census data, such as employment statistics.

Scoring component 735 computes a diversity score for plurality of images 705 based on the distribution provided by distribution component 730. In at least one embodiment, scoring component 735 computes the diversity score by comparing the distribution and the baseline distribution. For example, the diversity score may be an overlap score between the distribution and a reference distribution, such as the baseline distribution or the additional baseline distribution:

$$D_{12} = \sum_{j=1}^{J} \min(p_{1,j}, p_{2,j}) \qquad (1)$$

where $p_1$ is the distribution and $p_2$ is the reference distribution.

In some examples, scoring component 735 computes a Hellinger distance between the distribution and the baseline distribution, where the diversity score is based on the Hellinger distance. In at least one embodiment, scoring component 735 computes the diversity score by comparing the distribution to the baseline distribution and the additional baseline distribution. For example:

$$D_{12} = \left(1 - \left(1 - \sum_{j}(p_{1j} \cdot p_{2j})^{\frac{1}{2}}\right)^{1/2}\right)^2 \qquad (2)$$

where $p_{1j}$ is the probability of the jth value in the distribution. The diversity score takes a value of 1 when the distribution and a reference distribution are the same, and has a minimum value of 0. The diversity score may penalize a distance for overestimating "majority" class in the distribution of a sensitive attribute in plurality of images 705, compared to a same magnitude of underestimation of the majority class in the distribution. Scoring component 735 may compare the diversity score based on a comparison of the distribution and the baseline distribution and the diversity score based on a comparison of the distribution and the additional baseline distribution. In some examples, scoring component 735 orders the images based on the diversity score. For example, scoring component 735 can order the images such that a normalized diversity score that takes the position of images in an image set into consideration is optimized.

The machine learning apparatus collects metrics 740. Metrics 740 may include at least one of the diversity score, the distribution, the baseline distribution, the additional baseline distribution, attributes list 725, and plurality of images 705. In at least one embodiment, the image collection network identifies additional images having the sensitive attribute based on the diversity score. In at least one embodiment, the image collection network may combine plurality of images 705 with the additional images to obtain a representative set of images. For example, if the diversity score is below a predetermined threshold (determined either by the user and communicated with the machine learning apparatus via the user device as part of a query process, or predetermined by the machine learning apparatus), the image collection network can retrieve additional images, add the additional images to plurality of images 705, and the machine learning apparatus can repeat the process of obtaining a diversity score for the combination of the additional images and plurality of images 705. The machine learning apparatus can repeat this process until the diversity score of the combination of the additional images and plurality of images 705 meets or exceeds the predetermined threshold, and is therefore a representative set of images. The image collection network may then provide the representative set of images to the user, and the representative set of images may be included in metrics 740.

Plurality of images 705 is an example of, or includes aspects of, the corresponding element described with reference to FIG. 4. Face detection network 710 is an example of, or includes aspects of, the corresponding element described with reference to FIGS. 3 and 4. Faces 715 is an example of, or includes aspects of, the corresponding element described with reference to FIG. 4. Image classification network 720 is an example of, or includes aspects of, the corresponding element described with reference to FIGS. 3 and 4. Attributes list 725 is an example of, or includes aspects of, the corresponding element described with reference to FIG. 4. Distribution component 730 is an example of, or includes aspects of, the corresponding element described with reference to FIGS. 3 and 4. Scoring component 735 is an example of, or includes aspects of, the corresponding element described with reference to FIGS. 3 and 4.

Training

A method for diversity auditing is described. One or more aspects of the method include identifying a training set including a plurality of training images and label data identifying a ground truth sensitive attribute of a face in each of the plurality of training images; classifying the face in each of the plurality of images using an image classification network to obtain a predicted sensitive attribute; updating parameters of the image classification network by comparing the predicted sensitive attribute to the ground truth sensitive attribute; applying the image classification network to a plurality of images to obtain a distribution of the sensitive attribute in the plurality of images; and computing a diversity score for the plurality of images based on the distribution.

Some examples of the method further include computing a loss function based on comparing the predicted sensitive attribute to the ground truth sensitive attribute. Some examples further include computing a gradient of the loss function, wherein the parameters of the image classification network are updated based on the gradient of the loss function. Some examples of the method further include training a face detection network to detect the face in each of the plurality of images, wherein the image classification network takes the face in each of the plurality of images as input.

Some examples of the method further include identifying a comparison population for the plurality of images. Some examples further include identifying a baseline distribution of the sensitive attribute based on the comparison population, wherein the diversity score is computed by comparing the distribution and the baseline distribution.

Figure 8:
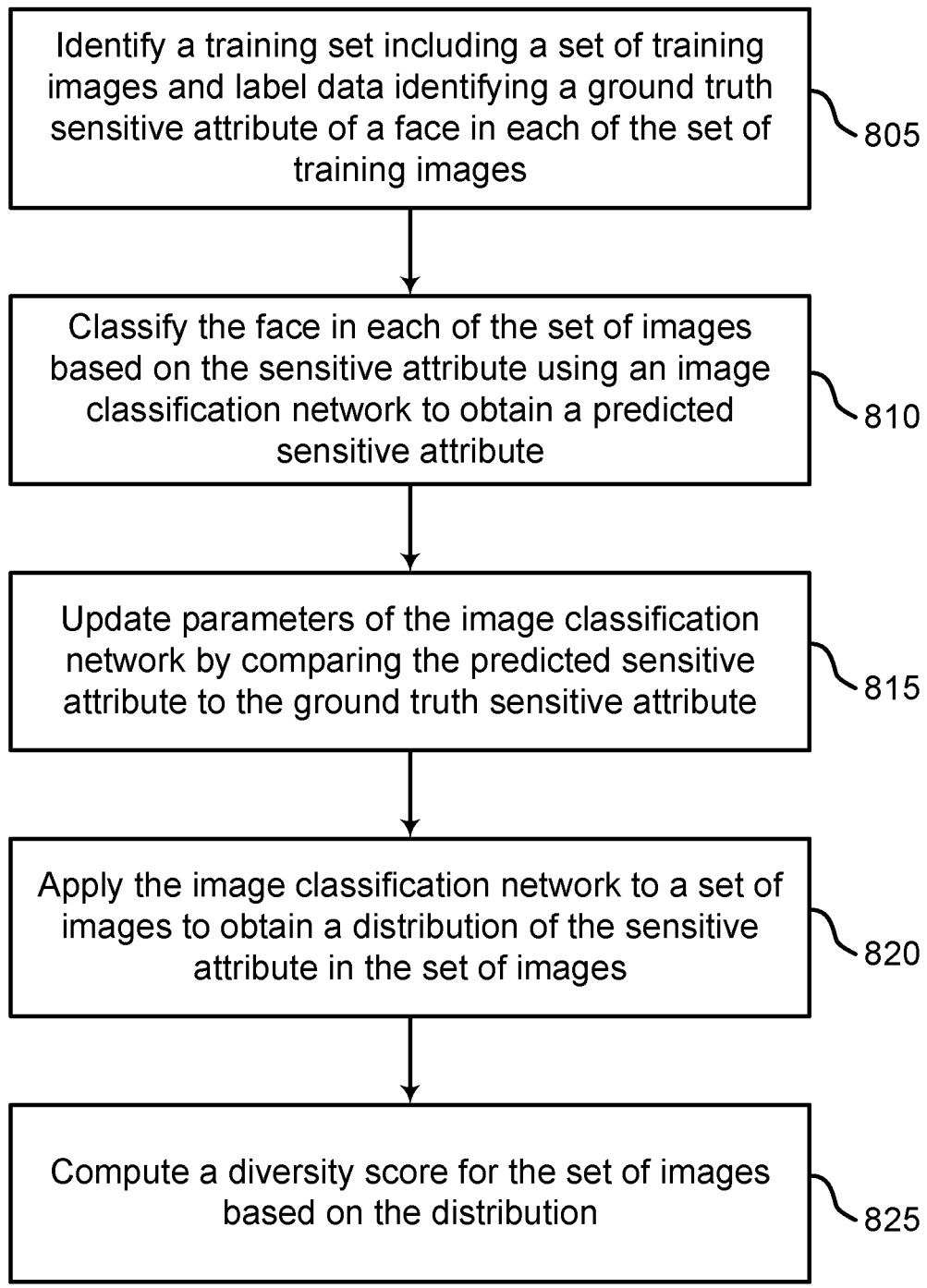
FIG. 8 shows an example of a process for updating a machine learning model according to aspects of the present disclosure.

FIG. 8 shows an example of updating a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system identifies a training set including a set of training images and label data identifying a ground truth sensitive attribute of a face in each of the set of training images. In some cases, the operations of this step refer to, or may be performed by, a training component as described with reference to FIG. 3.

At operation 810, the system classifies the face in each of the set of images using an image classification network to obtain a predicted sensitive attribute. In some cases, the operations of this step refer to, or may be performed by, an image classification network as described with reference to FIGS. 3, 4, and 7.

At operation 815, the system updates parameters of the image classification network by comparing the predicted sensitive attribute to the ground truth sensitive attribute. In some cases, the operations of this step refer to, or may be performed by, a training component as described with reference to FIG. 3.

At operation 820, the system applies the image classification network to a set of images to obtain a distribution of the sensitive attribute in the set of images. In some cases, the operations of this step refer to, or may be performed by, a distribution component as described with reference to FIGS. 3, 4, and 7.

At operation 825, the system computes a diversity score for the set of images based on the distribution. In some cases, the operations of this step refer to, or may be performed by, a scoring component as described with reference to FIGS. 3, 4, and 7.

Figure 9:
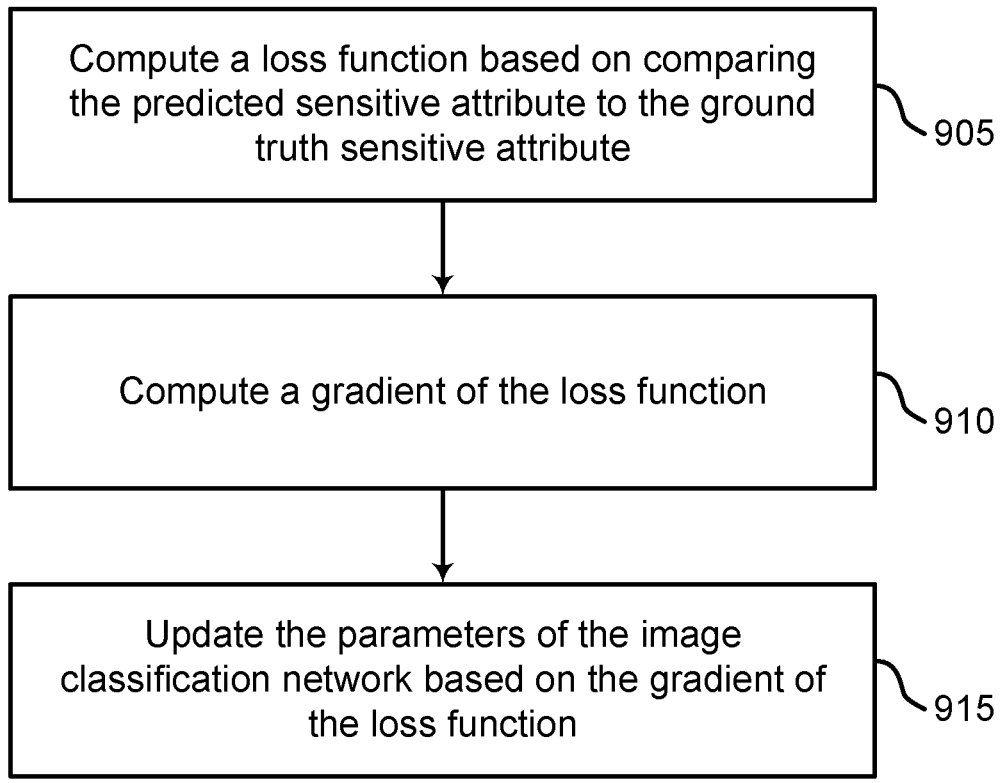
FIG. 9 shows an example of a process for computing a loss function according to aspects of the present disclosure.

FIG. 9 shows an example of computing a loss function according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system computes a loss function based on comparing the predicted sensitive attribute to the ground truth sensitive attribute. In some cases, the operations of this step refer to, or may be performed by, a training component as described with reference to FIG. 3.

At operation 910, the system computes a gradient of the loss function. In some cases, the operations of this step refer to, or may be performed by, a training component as described with reference to FIG. 3.

At operation 915, the system updates the parameters of the image classification network based on the gradient of the loss function. In some cases, the operations of this step refer to, or may be performed by, a training component as described with reference to FIG. 3.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for data auditing, comprising:
identifying a plurality of images;
detecting a face in each of the plurality of images using a face detection network;
classifying the face in each of the plurality of images based on a sensitive attribute using an image classification network, wherein the sensitive attribute relates to an age, a race, or a gender of the face in each of the plurality of images;
generating a distribution of the sensitive attribute in the plurality of images based on the classification; and
computing a diversity score for the plurality of images based on the distribution, wherein the diversity score indicates a statistical diversity of the distribution of the sensitive attribute in the plurality of images.

2. The method of claim 1, further comprising:
identifying a website; and
collecting the plurality of images from the website.

3. The method of claim 2, further comprising:
performing an image search on the website; and
receiving search results for the image search, wherein the plurality of images is collected from the search results.

4. The method of claim 1, further comprising:
ordering the plurality of images based at least in part on the diversity score.

5. The method of claim 1, further comprising:
generating an image feature vector for each of the plurality of images, wherein the classification is based on the image feature vector.

6. The method of claim 1, further comprising:
identifying a comparison population for the plurality of images; and
identifying a baseline distribution of the sensitive attribute based on the comparison population, wherein the diversity score is computed by comparing the distribution and the baseline distribution.

7. The method of claim 6, further comprising:
computing a Hellinger distance between the distribution and the baseline distribution, wherein the diversity score is based on the Hellinger distance.

8. The method of claim 6, further comprising:
identifying an additional baseline distribution of the sensitive attribute, wherein the diversity score is computed by comparing the distribution to the baseline distribution and the additional baseline distribution.

9. The method of claim 1, further comprising:
identifying additional images having the sensitive attribute based on the diversity score; and
combining the plurality of images with the additional images to obtain a representative set of images.

10. The method of claim 9, further comprising:
generating the additional images using a generative adversarial network (GAN).

11. The method of claim 1, wherein:
the sensitive attribute comprises race, gender, or age.

12. A method for data auditing, comprising:
identifying a training set including a plurality of training images and label data identifying a ground truth sensitive attribute of a face in each of the plurality of training images;
classifying the face in each of the plurality of images using an image classification network to obtain a predicted sensitive attribute, wherein the predicted sensitive attribute relates to an age, a race, or a gender of the face in each of the plurality of images;
updating parameters of the image classification network by comparing the predicted sensitive attribute to the ground truth sensitive attribute;
applying the image classification network to a plurality of images to obtain a distribution of a sensitive attribute in the plurality of images; and
computing a diversity score for the plurality of images based on the distribution, wherein the diversity score indicates a statistical diversity of the distribution of the sensitive attribute in the plurality of images.

13. The method of claim 12, further comprising:
computing a loss function based on comparing the predicted sensitive attribute to the ground truth sensitive attribute; and
computing a gradient of the loss function, wherein the parameters of the image classification network are updated based on the gradient of the loss function.

14. The method of claim 12, further comprising:
training a face detection network to detect the face in each of the plurality of images, wherein the image classification network takes the face in each of the plurality of images as input.

15. The method of claim 12, further comprising:
identifying a comparison population for the plurality of images; and
identifying a baseline distribution of the sensitive attribute based on the comparison population, wherein the diversity score is computed by comparing the distribution and the baseline distribution.

16. An apparatus for data auditing, comprising:
a face detection network configured to detect a face in each of a plurality of images;
an image classification network configured to classify the face in each of the plurality of images based on a sensitive attribute, wherein the sensitive attribute relates to an age, a race, or a gender of the face in each of the plurality of images;

a distribution component configured to generate a distribution of the sensitive attribute in the plurality of images based on the classification; and
a scoring component configured to compute a diversity score for the plurality of images based on the distribution, wherein the diversity score indicates a statistical diversity of the distribution of the sensitive attribute in the plurality of images.

17. The apparatus of claim 16, further comprising:
an image collection component configured to collect the plurality of images from a website.

18. The apparatus of claim 16, further comprising:
a generator network configured to generate additional images based on the diversity score.

19. The apparatus of claim 16, wherein:
the face detection network comprises a convolutional neural network (CNN) architecture.

20. The apparatus of claim 16, wherein:
the image classification network comprises a residual neural network (ResNet) architecture.

* * * * *